(12) United States Patent
Winker et al.

(10) Patent No.: US 7,999,213 B2
(45) Date of Patent: Aug. 16, 2011

(54) COMPACT HIGH-SPEED THIN MICROMACHINED MEMBRANE DEFORMABLE MIRROR

(75) Inventors: Bruce K. Winker, Ventura, CA (US); Yu-Hua K Lin, Oak Park, CA (US); Sridhar Narayanaswamy, Thousand Oaks, CA (US); Bing Wen, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 331 days.

(21) Appl. No.: 12/241,993

(22) Filed: Sep. 30, 2008

(65) Prior Publication Data
US 2010/0078543 A1    Apr. 1, 2010

(51) Int. Cl.
*G01J 1/20* (2006.01)
*G02B 7/188* (2006.01)

(52) U.S. Cl. ..................... 250/201.9; 359/847
(58) Field of Classification Search ............ 250/201.9, 250/216, 234, 235, 239; 359/212.1, 290, 359/291–295, 846–849, 245, 868; 356/494, 356/512, 521, 513, 514, 488, 499
See application file for complete search history.

(56) References Cited

U.S. PATENT DOCUMENTS

| | | | |
|---|---|---|---|
| 4,441,791 A * | 4/1984 | Hornbeck | 359/295 |
| 4,737,621 A * | 4/1988 | Gonsiorowski et al. | 250/201.9 |
| 5,287,215 A * | 2/1994 | Warde et al. | 359/293 |
| 5,311,360 A * | 5/1994 | Bloom et al. | 359/572 |
| 5,508,091 A * | 4/1996 | Austin | 428/216 |
| 5,719,846 A * | 2/1998 | Matoba et al. | 369/112.29 |
| 5,966,235 A * | 10/1999 | Walker | 359/291 |
| 6,339,219 B1 * | 1/2002 | Ishizuya et al. | 250/330 |
| 6,351,329 B1 * | 2/2002 | Greywall | 359/290 |
| 7,031,040 B2 * | 4/2006 | Fujii et al. | 359/199.1 |
| 7,192,144 B2 * | 3/2007 | Ho | 359/846 |
| 7,518,780 B2 * | 4/2009 | Papavasiliou et al. | 359/290 |
| 2001/0034083 A1 * | 10/2001 | Coyle et al. | 438/127 |
| 2004/0125472 A1 * | 7/2004 | Belt | 359/847 |
| 2006/0152830 A1 * | 7/2006 | Farah | 359/846 |

* cited by examiner

*Primary Examiner* — Georgia Y Epps
*Assistant Examiner* — Jennifer Bennett
(74) *Attorney, Agent, or Firm* — Glenn H. Lenzen; Husch Blackwell LLP (57) ABSTRACT

Provided is a compact, high-speed deformable mirror for use with an adaptive optic. The mirror or wavefront correction device corrects and/or compensates for wavefront aberrations present in a wavefront received by the optics. The mirror includes a deformable membrane which may be made of a semiconductive, metallic or insulating material. Positioned in close proximity to a front surface of the membrane is a transparent conductor, which may be covered by a window having an anti-reflective coating. A plurality of electrostatic actuators is located in close proximity to a back surface of the membrane, the conductor and actuators separated by a gap of approximately 10 μm. In operation, a bias voltage is applied to the transparent conductor and an actuator voltage is applied to the plurality of actuators. The resultant voltage differential across the membrane defines the amount of membrane deformation, which in turn compensates for distortions in a subsequently reflected wavefront.

11 Claims, 6 Drawing Sheets

COMPACT HIGH-SPEED THIN MICROMACHINED MEMBRANE DEFORMABLE MIRROR

This invention was made with the United States Government support under Contract No. 0376/FA8650-04-D-1712 awarded by AFRL/SNJM and AFRL/DE. The Government has certain rights in this invention.

FIELD OF THE INVENTION

This invention relates generally to wavefront correction or compensation devices. More particularly, this invention relates to a compact, high-speed deformable mirror having a membrane which deforms in the presence of a voltage differential across the membrane.

BACKGROUND

Compact, high-speed wavefront correction devices having deformable mirrors (DMs) are needed for adaptive optics (AOs). In particular, devices are needed to correct wavefront aberrations or distortions, often due to turbulence and/or system optical aberrations. Perhaps the most challenging applications of adaptive optics involve corrections of turbulence on airborne platforms. In this type of environment, a large number of actuators (in excess of 100) are required to actually deform the mirror. A large phase throw (>8 microns) and high, closed-loop bandwidths (typically >1 kHz) are also needed. In addition, the entire adaptive optics system, including the DM wavefront corrector and its controller, must be compact. This requirement drives the optical beam diameter down to 1-2 cm.

Large DM actuator spacing ($\geq 2$ mm) is the primary reason for the large size and weight of existing adaptive optics systems. The size of the entire adaptive optics bench tends to vary linearly with actuator spacing. The F-number of the optical system is typically invariant. Therefore, the optical bench size varies linearly with the beam size, and the beam size depends on DM actuator number and spacing. For example, current micromachined membrane and piezoelectrically actuated DMs have actuator spacings of 2 mm and $\geq 2.5$ mm, respectively. An adaptive optics system that relies on these technologies, and provides 37 actuators across the aperture, then requires a 7.4-9.3 cm minimum beam size on the optical bench. In airborne lasercom transceivers, however, the optimum beam size on the optical bench is 1-2 cm. If the number of actuators across the array exceeds about 7-9 (i.e., 37-61 actuators in a hexagonal array), existing DM technologies are simply too big to fit on the lasercom optical bench without requiring a significant increase in bench size and weight.

Conventional bulk micromachined membrane DMs sold today (e.g. FIG. 1) are electrostatically driven using an array of actuators 100 below the membrane 102. A DC voltage is applied to the membrane to deform it into a static parabolic shape (as shown by the dashed lines in FIG. 1), thereby producing tensile stress in the membrane that acts to pull it back into a flat shape. By increasing or decreasing the applied voltage at the metal actuators below the membrane, the membrane is distorted from the parabolic profile, thereby producing the equivalent of local piston stroke.

These membrane DMs suffer from several drawbacks: 1) The membrane is made from silicon nitride, which may undergo dielectric relaxation when DC biased, resulting in short-term drift in the deflection vs. voltage response; 2) Low electrostatic pressure and/or high membrane tensile stress limit the smallest effective actuator pitch (i.e., the spacing between the same edge of adjacent actuators) to 2.0 mm or more; 3) A pre-biased membrane also has limitations in the amplitude of correction at high spatial frequencies ($f_s=(2*$actuator pitch$)^{-1} \sim 0.5$ mm$^{-1}$); 4) To allow room for the membrane to achieve a parabolic shape, the gap "$d_1$" between the membrane and the metal conductors on the backplane is on the order of 40-100 microns; 5) These membrane DMs can achieve only a modest optical phase throw of ~4 microns, even though they are operated at control voltages of 200-300 V. Electrostatic devices exhibit a quadratic dependence of electrostatic pressure P on the voltage V and gap d, according to the equation:

$$P = \epsilon_o (V/d)^2$$

This relationship says that, all other parameters being equal, a device having a smaller gap will operate at a lower voltage; 6) Due to large gap and high values of membrane residual tensile stress (>100 MPa), the actuator spacing is limited to about 2 mm and significant coupling between actuators is observed; 7) The total number of actuators for a membrane DM is higher than for other technologies because membrane mirrors require additional actuators outside the optical aperture to achieve large deflections at the pupil edge that are necessary to reproduce Zernike polynomials; 8) The minimum actuator spacing dictates the total size of the membrane/actuator array for a given size and number of actuators across the array: 9) Membrane DMs require a second optical element to remove the parabolic curvature from the wavefront; 10) Current membrane DMs are not hermetically sealed and operate in 1 atm air pressure, which strongly dampens membrane oscillations; and 11) They are sensitive to microphonics and electrostatic damage. These features of the conventional membrane DMs, while minimizing costs, significantly reduce membrane dynamic range at high temporal and spatial frequencies.

Hence, there is a need for a compact, high-speed DM to overcome one or more of the drawbacks identified above.

SUMMARY OF THE INVENTION

The invention herein disclosed is a deformable mirror (DM) that advances the art and overcomes several of the problems articulated above. This invention provides a DM wavefront correction device that operates at high frequencies in the kHz range, exhibiting large optical phase throw at high spatial frequency. At low spatial frequency, typical of current membrane DM technology, this invention operates at much lower voltage. This invention also provides methods to obtain very low stress membranes, low loss and manufacturable transparent conductor design, and methods to drive the device for accurate high order Zernikes with fast membrane response.

In particular, and by way of example only, according to an embodiment, provided is a DM including: a deformable membrane having a reflective front surface and a back surface; a plurality of electrostatic actuators positioned in close proximity to the back surface of the membrane to define a first gap between the plurality of electrostatic actuators and the back surface of the membrane; at least one transparent conductor positioned in close proximity to the front surface to define a second gap between the at least one transparent conductor and the front surface of the membrane; wherein a bias voltage is applied to the transparent conductor and actuator voltages are applied to the plurality of electrostatic actuators; the deformation of the membrane is induced by voltage differentials between the bias voltage applied to the transparent conductor and the actuator voltages applied to the plurality of electrostatic actuators. The bias and actuator voltages are all relative to the membrane voltage, which is typically held at earth ground.

Specifically, the membrane, which can be composed of more than one layer of material, has a low net residual stress of all the layers. e.g. 0-50 MPa tensile. This low net residual tensile stress range is necessary for low voltage operation. However, because a conventional membrane DM requires a large gap to allow the membrane to deform into a concave shape, a transparent conductor is included in the design to "pull up" the membrane in order to maintain a flat quiescent state and thereby reduce the gap. High optical phase throw at low voltage is achieved by reducing the gap between the membrane and the adjacent conductors to <40 microns, and preferably <20 microns. These novel design parameters permit the use of small actuator pitch values of <1 mm, and achieve high optical phase throw (i.e., 4-8 microns) at high spatial frequencies of >0.5 mm$^{-1}$ (spatial frequency=(2*actuator pitch)$^{-1}$. Thus, for the thin deformable membrane (TDM) device, low activation voltage (<300 V) and high temporal and spatial frequency response are simultaneously possible for a membrane mirror by using low residual tensile stress (<50 MPa tensile), a small membrane-to-actuator and transparent conductor-to-membrane gap (<40 microns), and low pixel spacing (<1 mm). Furthermore, the transparent conductor allows more accurate high-order Zernike profiles to be generated than those prior art with no transparent conductor.

The transparent conductor utilizes a proprietary low-loss Transcon™ film, which can have 0.2-1% absorption in the infrared, depending on process conditions, for handling high optical power density. The transparent conductor utilizes an easily manufacturable design that makes assembly of a controlled gap simple.

In another embodiment, provided is a method of compensating for distortions in a wavefront received by the adaptive optics, the method including: applying a bias voltage to at least one transparent conductor positioned in close proximity to a first surface of a deformable membrane; applying actuator voltages to a plurality of electrostatic actuators structured and arranged in close proximity to a second surface of the membrane; generating voltage differentials between the bias voltage applied to the transparent conductor and the actuator voltages applied to the plurality of electrostatic actuators; and reflecting the wavefront having distortions off the first surface of the membrane wherein the voltage differentials induce a predetermined deformation in the membrane, and further wherein the deformation in the membrane compensates for the distortions in the received wavefront. The bias and actuator voltages are all relative to the membrane voltage, which is typically held at earth ground.

DETAILED DESCRIPTION OF THE INVENTION

Before proceeding with the detailed description, it should be noted that the present teaching is by way of example, not by limitation. The concepts herein are not limited in use or application with one specific type of DM. Thus, although the instrumentalities described herein are for the convenience of explanation, shown and described with respect to exemplary embodiments, the principles herein may be equally applied in other types of DMs.

Figure 1:
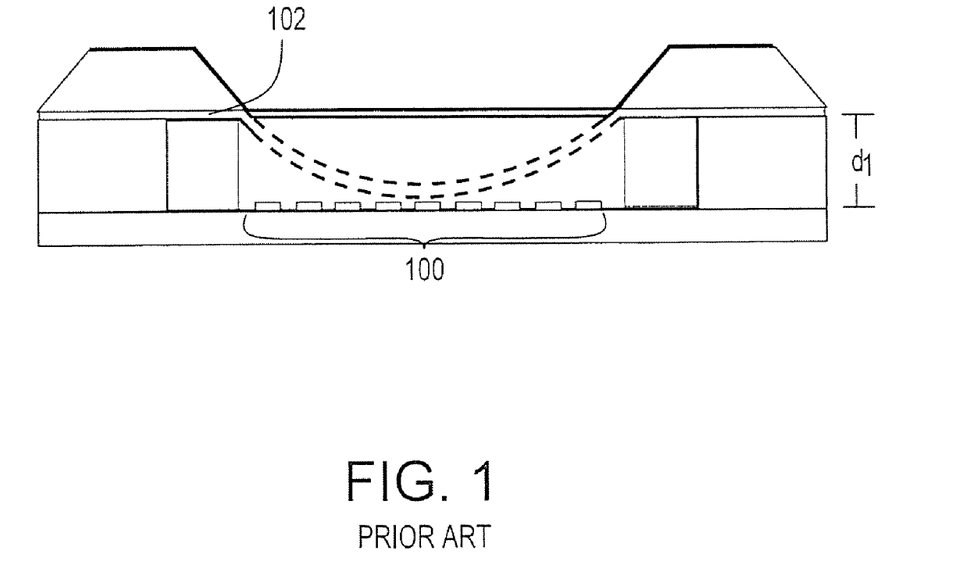
FIG. 1 is a representation of a deformable membrane/mirror known in the prior art.

FIG. 1 depicts a deformable mirror as known in the art. A compact, high-speed, wavefront corrector or DM 200 according to the present disclosure is presented in FIG. 2. The DM 200 is scalable to incorporate a large number of actuators 218, requires an operating voltage at or below 50 V for low spatial frequency operation, and achieves a mechanical resonance frequency greater than 2 kHz, thereby allowing for substantially continuous wavefront corrections. Reduced voltages equate to a reduced circuit density, which leads to smaller, lighter weight control electronics. For example, a reduction in operating voltage from 300 V to 50 V reduces power consumption by at least a factor of 10×.

Figure 2:
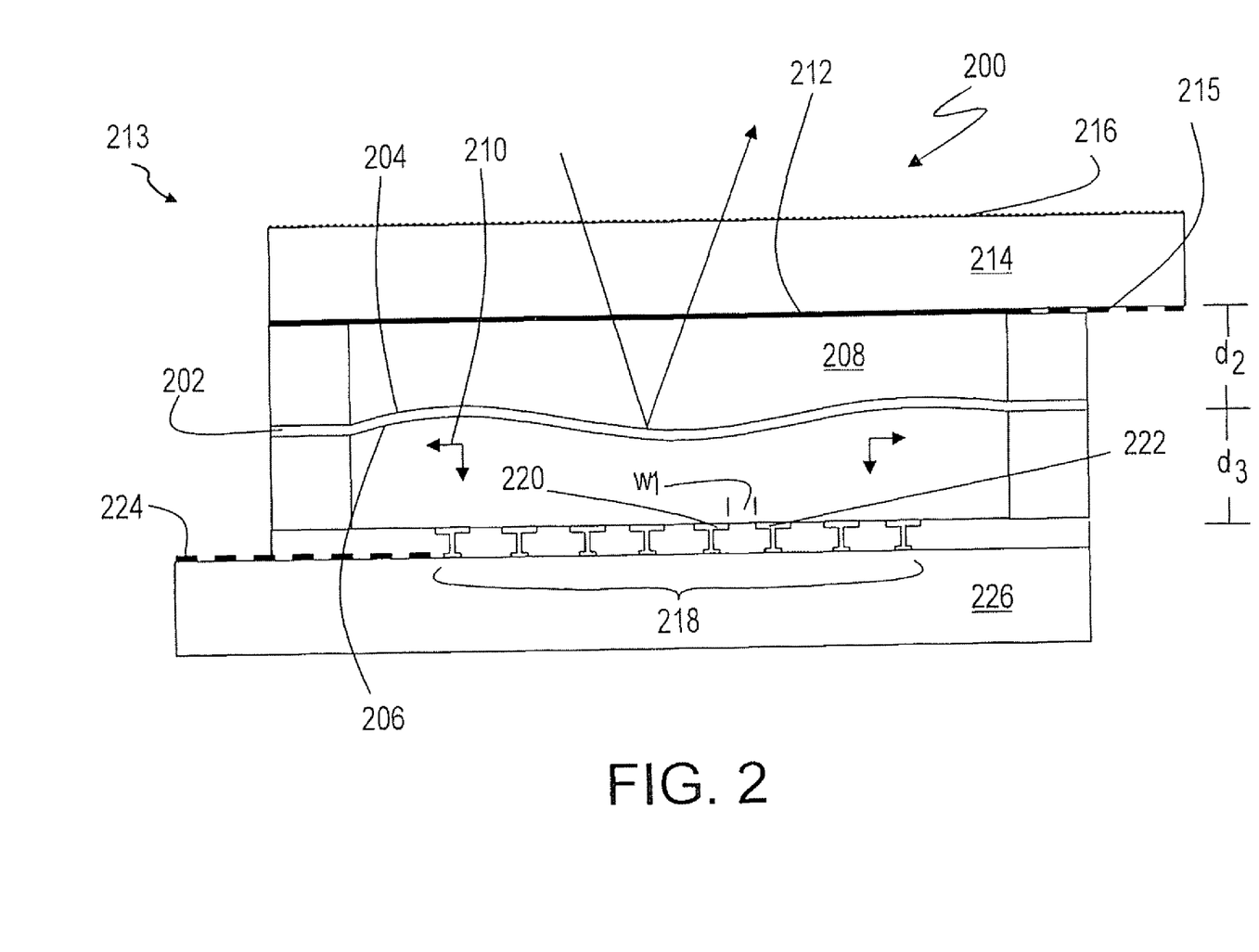
FIG. 2 is a deformable mirror according to a present embodiment.

As shown in FIG. 2, the DM 200 includes a thin membrane 202, having a top surface 204 and a bottom surface 206. Specifically, the membrane 202 may be of any material(s), such as a semiconductor, metal, and/or insulator. In at least one embodiment of the membrane, the membrane can be a silicon-based material, for example, a silicon or a silicon nitride Film, on the order of micron(s) thick, released from bulk micromachining of a silicon wafer, and then coated with metal and highly reflective layer(s). In another embodiment of the membrane, the membrane can be a polymer film, on the order of micron(s) thick, that has been mounted on a supporting structure, like metal rings, and then coated with a highly reflective coating.

The deformable mirror 200 is sealed within a hermetically packaged cell 208 (not shown). The cell is placed in vacuum, or in an inert gas to stiffen the membrane response and thereby increase the resonant frequency of the membrane 202. The optimal pressure level of the inert gas to get the largest resonance frequency with the fastest membrane response will depend on the details of the membrane design. Furthermore, since the cell 208 is shielded from external fields by the transparent conductor, the membrane 202 is relatively insensitive to electrostatics and acoustic disturbances.

Residual tensile stress in the membrane 202 (indicated for example by arrow 210 in FIG. 2) is on the order of 0-50 MPa, as opposed to >50 MPa for prior art devices. Optimization of membrane stress to between 0-50 MPa tensile helps to minimize the control voltage required, and hence the size of the voltage source, controller, etc. (not shown). The stresses of the individual layers in the membrane are optimized such that the total stress of the membrane is 0-50 MPa tensile. This low stress range allows for high spatial frequency operation, or low activation voltage in the case of low spatial frequency operation.

The steps of a method to control net membrane residual stress to 0-50 MPa tensile are a function of several parameters as discussed in greater detail as follows. If the membrane has only one layer, the stress of that single layer must be controlled through its deposition process. If the membrane consists of more than one layer, and the deposition process for each layer is controllable to well below 50 MPa tensile stress, then the complete membrane stack can be 0-50 MPa net tensile stress. If the membrane consists of more than one layer, and the deposition process for each layer is high, say more than 50 MPa, then the thickness of the of the higher stress film can be reduced to reduce the net stress.

If the stress and/or net stress are compressive, then thermal annealing can be used to shift the stress level. Annealing the individual layers and/or the total membrane stack at an elevated temperature can be used as a technique to shift the net stress of the film. By way of example, annealing compressive $Nb_2O_5$—$SiO_2$ reflective layers sputter deposited on Al-coated silicon nitride membrane at room temperature to 200-300 C makes the stack less compressive or more tensile. The higher or longer the temperature excursion, the more shift in stress. This technique of annealing can be used to "tune" the desired membrane stress from compressive to the final desired tensile stress value. Thus, if the membrane buckles due to compressive stress, annealing can be used to reduce stress and flatten out the membrane mirror.

Film stresses from fabrication are normally not very low, e.g. silicon nitride films can typically have large stresses, i.e. hundreds of MPa. Thus, silicon nitride membrane mirror stress can be decreased by starting with a relatively high tensile stress nitride film e.g. ~100 MPa, and depositing a compressive stress reflective oxide, to yield a net low tensile membrane. Through very careful process control, low stress silicon nitride films can be made; even silicon nitride films can now be fabricated with low stress <50 MPa, but with lower process yield. Polymer membrane stresses are usually low.

Again, referring to FIG. 2, positioned in close proximity to the top surface 204 of the membrane 202 is a transparent conductor 213 comprised of an optically flat window 214, transparent or substantially transparent in the appropriate wavelength region, having a transparent conductive film 212 deposited on the bottom surface. In at least one embodiment, the transparent conductor 212 is a Transcon™ film. This transparent conductor 212 is typically a low-loss conductor demonstrating absorption of 0.2-1% at 1.55 micron wavelength, depending on deposition process. As such, the Transcon™ film 212 may operate in an environment wherein the optical power density is on the order of ~20 $kW/cm^3$. A metallic lead 215 electrically connects the transparent conductor 212 to a voltage source (not shown).

The front and/or back surfaces of the window 214 are coated with anti-reflective ("AR") coatings 216. The AR coatings 216 help to ensure that the wavelength energy incident on the DM 200 is transmitted through the window 214 to the membrane 202, and that energy is not reflected back in the direction of propagation at the front and/or back surfaces of the window 214. At least one of the two surfaces of the window 214 is AR-coated 216. In at least one embodiment, the back surface of the window 214 is coated with AR-coating 216 on the very bottom, being, exposed to a low-pressure environment on the bottom side 208, and next to the transparent conductor film 212 on the topside. In another embodiment, the AR-coating can be embedded in the middle between the window 214 and the transparent conductor film 212.

The gap "$d_2$" between membrane 202 and the transparent conductor 213 is small, which is to say on the order of 10-50 µm. In at least one embodiment, a 10 µm spacing, may be made with bead or fiber spacers (e.g. glass), by depositing film material(s) 10 µm thick, by etching, a 10 µm dip into the active area of the transparent conductor 213, or physically holding the conductor with appropriate micro-positioners and/or fixturings at 10 µm from the membrane 202.

Figures 3, 3A:
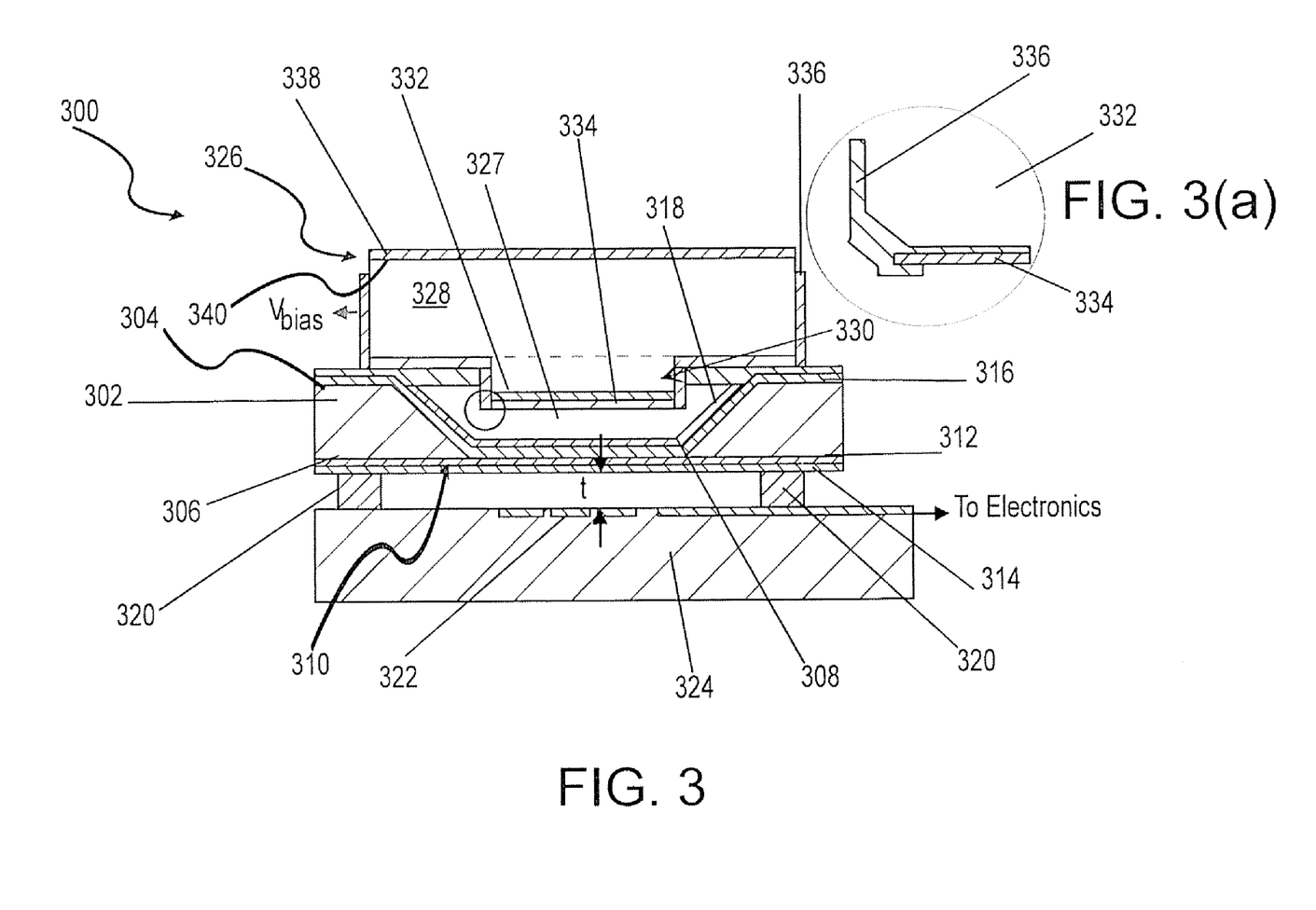
FIG. 3 is a deformable mirror incorporating a silicon nitride membrane according to an embodiment.
FIG. 3(a) is a sectional view of a portion of the deformable mirror of FIG. 3 expanded to show portions thereof in greater detail.
Figure 4:
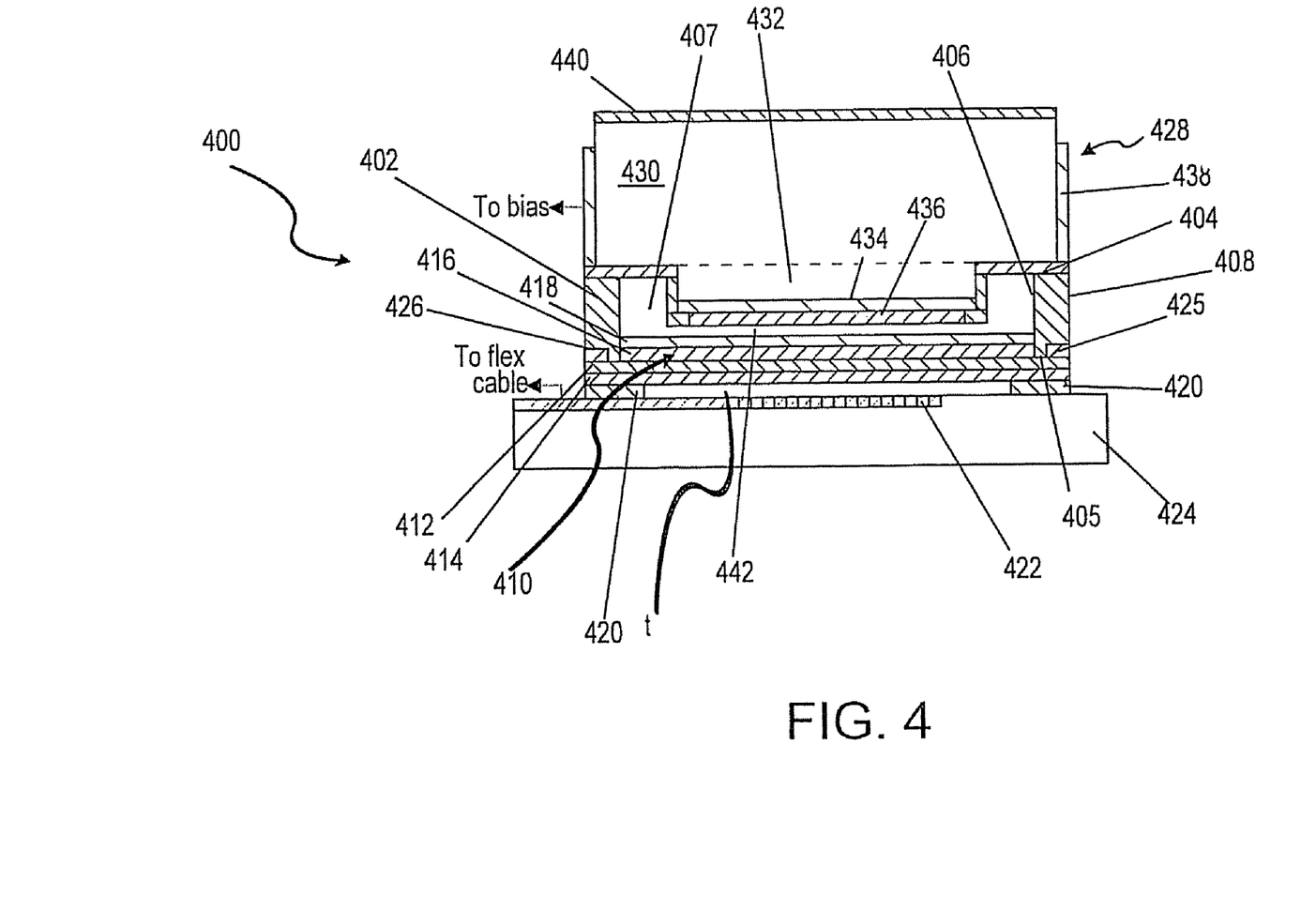
FIG. 4 is a deformable mirror incorporating a polymer membrane according to an embodiment.

FIG. 2 depicts an embodiment of the present invention which does not include a thick ring or substrate supporting the membrane. FIGS. 3 and 4 illustrate embodiments in which the membrane is formed of a preselected material composition and is supported by a surrounding ring or substrate of sufficient thickness to support the membrane during the fabrication process. As will be described below in greater detail, one surface of the membrane is flush with a surface of the thick supporting ring or substance. The other surface of the membrane is in a cavity more than at least hundreds of microns deeper than the surface of the thick supporting ring or substrate. A thin gap may be made by physical holding the conductor (or actuator) with appropriate micropositioners and/or fixturings at 10-50 µm from the membrane. However, this method is difficult to mass-produce with such a deep cavity.

Referring to FIG. 3, another embodiment of a compact, high-speed wavefront corrector or DM 300 is illustrated in cross-section. The DM 300 includes a membrane support ring 302, which by way of example, may be in the form of a silicon wafer; however, other suitable materials configurations may also be used without departing from the scope of the invention. The support ring is generally annular in configuration and includes an upper surface 304, a lower surface 306 and an aperture 308 which extends between the upper and the lower surfaces. A deformable membrane assembly 310 is disposed along the lower surface 306 of the support ring and includes a thin membrane or organic film 312 which may be of any suitable material(s), by way of example, silicon or silicon nitride, as hereinabove described. One side of the membrane is coated with a first conductive layer 314. A second conductive layer 316 is applied to the upper surface 304 of the support ring 302 and extends across the aperture 308 and in contact with the other side of the membrane. A reflective coating or layer 318 is deposited on the second conductive layer 316 and also extends across aperture 308. The deformable membrane assembly and the support ring are positioned on spacers 320 which may be in the form of glass beads or fibers and are of a preselected thickness which may be varied to control the spacing t between the membrane assembly and a plurality of actuators 322 mounted on direct drive backplane 324 in a similar fashion as described above with respect to the embodiment of FIG. 2.

A unique transparent conductor assembly design 326 is depicted which has the advantage of tailoring of very small membrane-to-transparent conductor gap 327, is amenable to mass production, and is easy to assemble. Because light must pass through the transparent conductor to correct for wavefront error, the transparent conductor assembly must be in the form of an optical flat 328 several mm thick. The area of the optical flat is larger than that of the cavity 327 so that the flat can be placed on top of the membrane supporting structure 302. An inset piece 330, which is smaller in area than the cavity, is bonded preferably optically or with optical adhesive. The inset piece is positioned immediately adjacent to and against the thick flat and is also an optical flat comprising a conductive film 332 and an antireflective coating 334. The film may be made of a suitable conductive material, by way of example, Transcon™ The thickness of the inset is made to be nominally 10-50 µm thinner than the thickness of the supporting structure. Alternatively, this gap can also be obtained by etching out an inset into a thick optical flat, for example by deep reactive ion etching of $SiO_2$ (DRIE). To provide electrical access for biasing the transparent conductor, a thin layer of metal e.g., gold, 336, is deposited along the side of the complete transparent conductor. The metal must be in contact with the conductive film on the inset piece. Good electrical continuity along the side of transparent conductor is established by sufficiently rounding the edge(s) of the inset piece in the 10-500 nm rms roughness, depending on the thickness of the metal used: as shown in FIG. 3(a). To further ensure continuity, a small amount of adhesive, e.g., optical adhesive is applied at the intersecting corner between the inset piece and the large optical flat. An antireflective coating 338 is deposited on the surface 340 of the optical flat 328.

In operation, the transparent conductor assembly can be simply placed on top of the membrane supporting structure for a pre-determined gap 327. If a higher gap is desired, glass bead/fiber spacers may be added to adjust the gap. The dimensional requirements of the membrane-to-transparent conductor gap may be relaxed, since a larger bias voltage provides the same membrane response when the gap is small. Furthermore, to allow gas to move faster in and out of the membrane-to-transparent conductor gap during membrane motion, channels or evacuation paths can be etched into various locations on the transparent-conductor surface or the supporting ring 302.

Referring now to FIG. 4, yet another embodiment of a compact, high-speed DM 400 is illustrated in cross-section. The DM 400 includes a membrane support member 402 which may be formed of any suitable material, such as steel or stainless steel. The support member is generally ring-shaped and includes an upper surface 404, a lower surface 405, an inner surface 406 defining, an aperture 407 and an outer surface 408. A deformable membrane assembly 410 is disposed along the lower surface 405 and across the aperture 407 of the support member and includes a thin membrane or organic film 412 as described above. However, in the embodiment of FIG. 4, the membrane may be formed of a suitable polymer material, which, by way of example and not of limitation, may include polyimide membrane materials possessing physical and elastic properties similar to the properties of LaRC™-CP1 or LaRC™-CP2 polyimides (trademarks of NASA Langley Research Center) set forth below:

TABLE 1

|  | CP1 | CP2 |
| --- | --- | --- |
| Tensile Strenth | 14.5 ksi | 17 ksi |
| Tensile Modulus | 315 ksi | 420 ksi |

Both sides of the membrane are coated with a conductive layer 414, 416; the conductive layer, 416 being arranged to fit inside the aperture 407 and in contact with the inner surface 406 of the support member 402. A reflective coating 418 is deposited on conductive layer 416 and is likewise adapted to fit inside aperture 407 and in contact with the inner surface 406 of the support member. The deformable membrane assembly and support ring are positioned on spacers 420 which may be in the form of glass beads or fibers and are of a preselected thickness which may be varied to control the spacing t between the membrane assembly and a plurality of actuators 422 mounted on direct drive backplane 424. The support member may be severed to the membrane assembly by means of a suitable adhesive 425 which is inserted into slot or recess 426 formed in the lower surface 405 of the support members.

A transparent conductor assembly 428 similar in construction and operation to the transparent conductor assembly of the embodiment of FIG. 3 is positioned on to upper surface 404 of the support member 402. The transparent conductor assembly is in the form of an optical flat 430 having an area which is larger than that of the aperture so that the flat can be placed on top of the membrane supporting, structure 402. An inset piece 432 which is smaller in area than the aperture, is bonded preferably optically or with optical adhesive. The inset piece in the restrained state positioned immediately adjacent to and against the thick flat is also an optical flat and comprises a conductive film 434 and an antireflective coating 436. As in the embodiment of FIG. 3, the film may be made of a suitable conductive material, by way of example. Transcon™, and the thickness of the inset is made to be nominally 10-50 μm thinner than the thickness of the supporting, structure 402.

To provide electrical access for baising the transparent conductor, a thin layer of metal e.g., gold, 438 is deposited along the side of the complete transparent conductor assembly. The metal must be in contact with the conductive film on the inset piece. To further ensure continuity, a small amount of adhesive, e.g., optical adhesive, is applied at the intersecting corner between the inset piece and the large optical flat. An antireflective coating 440 is deposited on the surface of the optical flat 430. In operation, the transparent conductor can be simply placed on top of the membrane supporting structure for a pre-determined gap 442. If a higher gap is desired, glass bead/fiber spacers may be added to adjust the gap. The dimensional requirements of the membrane-to-transparent conductor gap may be relaxed, since a larger bias voltage provides the same membrane response when the gap is small. Furthermore, to allow gas to move faster in and out of the membrane-to-transparent conductor gap during membrane motion, channels or evacuation paths can be etched into various locations on the transparent conductor surface or support member 402.

In the embodiment of FIG. 2, the pitch, i.e., the spacing "$w_1$" between the same edge of adjacent actuators (e.g. actuators 220 and 222), is less than approximately 1.0 mm, and as low as e.g. 20 μm. In this way, greater than 128 actuators may be used in a DM device 200 while still reducing the overall optical bench size and enabling a high spatial frequency ($f_s$= (2*actuator pitch)$^{-1}$>0.5 mm$^{-1}$), as compared to prior art devices. Further, actuator coupling is acceptably low. With for example 1027 actuators spaced approximately 0.5 mm apart, a beam size of 18 mm and a spatial frequency of $f_s$=1 mm$^{-1}$ can be achieved.

The plurality of electrostatic actuators 218 is electrically connected to one or more metal leads 224 for providing a voltage to each actuator individually or collectively. Metal leads 224 are connected to a voltage source (not shown), which may or may not be the same voltage source as that used to provide a voltage to the transparent conductor 212. Both the metal leads 224 and the plurality of electrostatic actuators 218 are in contact with a planarized, direct drive backplane 226 having a surface roughness typically of <15 nm.

The plurality of electrostatic actuators 218 are positioned in close proximity to the bottom surface 206 of the membrane 202. The electrostatic actuators 218 are structured and arranged such that the gap "$d_3$" between membrane 202 and the electrostatic actuators 218 is small, which is to say on the order of 10-30 μm. In at least one embodiment, a 10 μm spacing may be made with bead or fiber spacers (e.g. glass), by depositing film material(s) 10 μm thick, by etching a 10 μm step into the active area of the actuators 218, or by physically holding the actuator with appropriate micro-positioners and/or fixturings (not shown) at 10 μm from the membrane 202. Furthermore, to allow gas to move faster in and out of the membrane-to-actuator gap during membrane motion, channels or evacuation paths can be etched into various locations on the actuator substrate.

Figure 5:
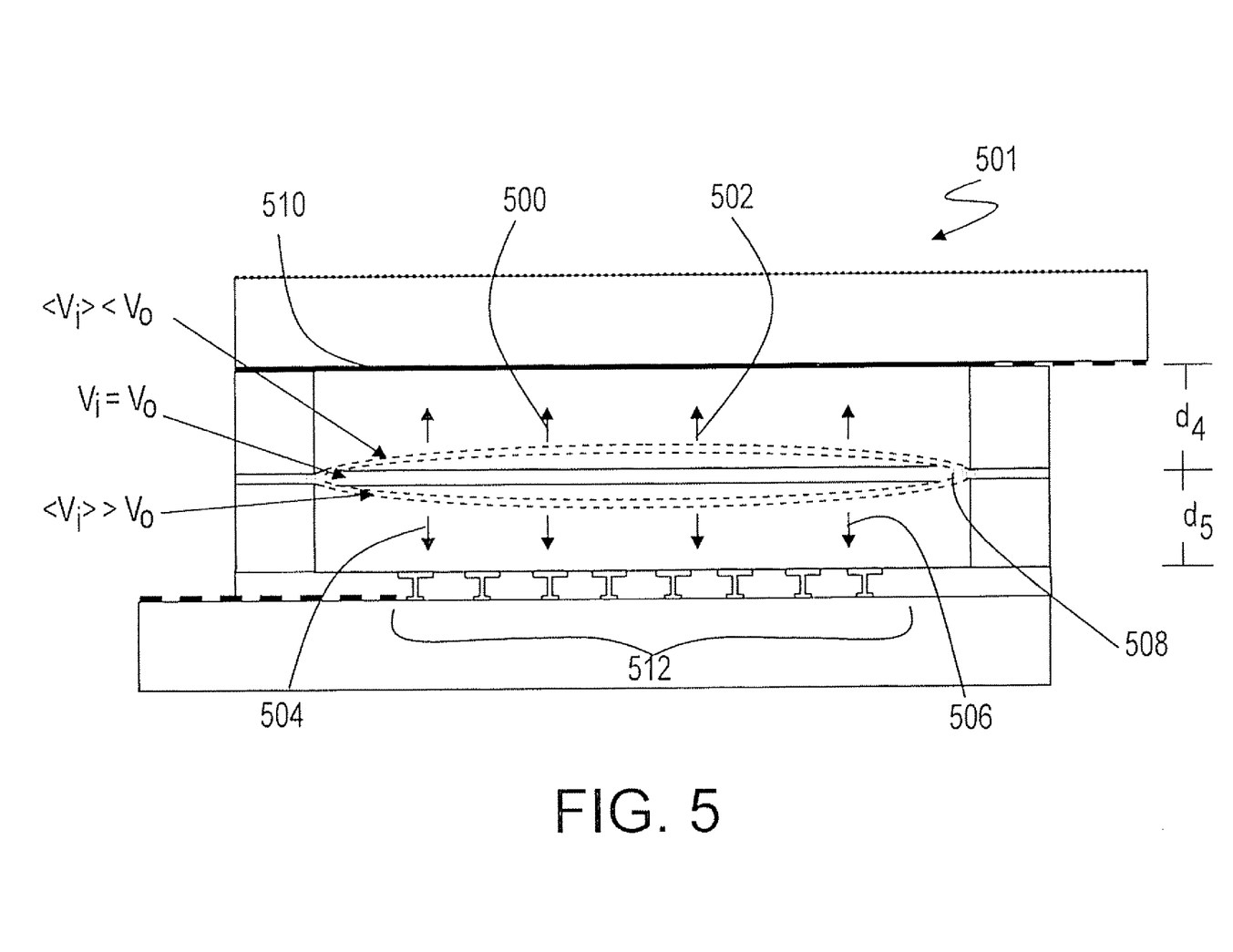
FIG. 5 is the deformable mirror of FIG. 2, which deforms consistent with a uniform voltage differential present across the surface of a deformable membrane.
Figure 6:
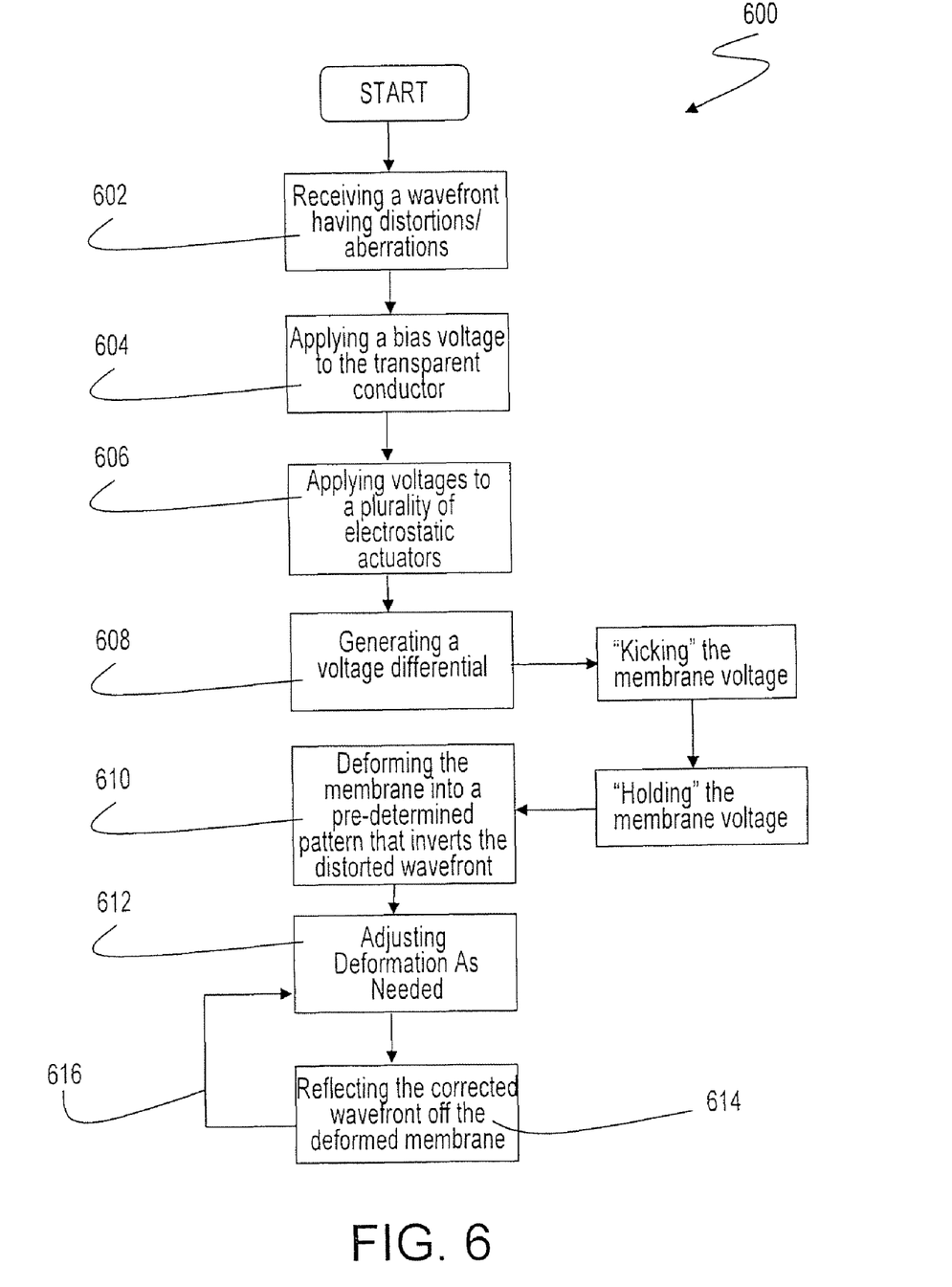
FIG. 6 is a method for correcting or compensating for wavefront aberrations present in a received wavefront, according to an embodiment.

The operation of a compact, high-speed, membrane DM 501 is graphically depicted in FIGS. 5 and 6. As shown in FIG. 5, voltage differentials are a key operational parameter. In operation, the average actuator voltage, $<V_i>$ may be less than, equal to, or greater than the transparent conductor bias voltage, $V_o$. The transparent conductor bias voltage $V_o$ and the actuator voltages $V_i$ determine the sign (+/−) and magnitude of the voltage differential for each actuator. Uniform deflection in an upward direction, as represented for example by arrows 500 and 502 in FIG. 5, occurs when $<V_i><V_o>$. Alternatively, uniform deflection in a downward direction (e.g. arrows 504 and 506) occurs when $<V_i>>V_0$. Of note, although FIG. 5 depicts a fairly uniform parabolic deformation of a membrane, it can be appreciated by those skilled in the art that non-uniform deformation may also be induced by applying different voltages to the actuators, consistent with the aberrations and/or deformations of the incoming wavefront. In this discussion $d_5$ and $d_6$ in FIG. 5 are assumed to have approximately the same value; however, $d_5$ and $d_6$ can take different values, in which case the bias voltage $V_o$ would be scaled appropriately to a higher or lower value, relative to $<V_i>$.

It can be appreciated that when $V_i=V_o$, the static shape of membrane 508 remains substantially flat (i.e. no parabolic curvature). As such, additional optics are not required to remove spherical wavefront distortion. Furthermore, the gap "$d_5$" between membrane 508 and the array of actuators 512 can be reduced to 10-30 µm. The control voltage in an electrostatically actuated device is proportional to the gap (e.g. $d_5$), therefore, the deformable mirror 501 of the present disclosure may operate at about 25-75% of the voltage of a conventional bulk micromachined membrane mirror having a membrane-to-actuator gap on the order of ~40 µm.

Referring now to FIG. 6, a flow chart 600 of the operation of a deformable mirror (e.g. mirror 501) is presented. As shown, a wavefront having a variety of distortional aberrations is received by the mirror, block 602. In order to maximize the optical properties of the wavefront, the mirror must compensate for these distortions/aberrations. Consequently, a bias voltage is applied to the transparent conductor, block 604. Simultaneously, one or more voltages are applied to one or more of the plurality of electrostatic actuators, block 606. It should be noted that the same voltage value. $V_o$, need not be applied to each actuator, depending on the desired deformation or curvature of the deformable mirror.

As a result of transmitting different voltages to the transparent conductor and each selected actuator, voltage differential(s) is established between the bias voltage applied to the transparent conductor and the actuator voltage, and electrostatic forces act upon the membrane consistent with the voltage differential(s). Consequently, the membrane deforms, block 610.

It may be necessary for a control system of the DM to adjust the membrane deformation by modifying the voltage differential(s), block 612, in order to achieve the optimal optical performance of the mirror. Depending on the duration(s) of the received wavefront(s) a feedback mechanism 616 may be used to further adjust the mirror and improve optical performance.

A method is provided to increase the speed at which the membrane arrives at a given position, by a kick-and-hold technique. If the membrane has a high restoring force (high residual stress), the speed at which the membrane moves from position 1 to position 2 is fast. If the membrane has a low restoring force (low residual stress), the speed at which the membrane moves from position 1 to position 2 is slow. The membrane can be made to move faster from position 1 to position 2 by "kicking" the membrane to a voltage higher than the voltage for position 2, then quickly e.g. microseconds later, resetting the voltage to a "holding" voltage which corresponds to position 2. The membrane, however, cannot be made to move at a frequency much beyond its natural frequency.

With the compact, high-speed, membrane DM of the present disclosure it is possible to achieve a mechanical resonance frequency of greater than several kHz, a spatial frequency of $f_s>0.5$ mm$^{-1}$, and a frame rate in excess of 20 kHz. The operating voltage of the system described above is typically less than ~300 V for an optical phase throw of 6 microns, and preferably less than 100 V. Further, the DM of the present disclosure achieves large stroke at high spatial frequency while maintaining long-term calibration stability. The DM may be employed with a variety of adaptive optics systems and subsystems needed for applications such as free-space laser communications and high resolution imaging on a mobile platform.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

What is claimed is:

1. A wavefront correction device for an adaptive optic, comprising:
   a support ring having an inner surface defining an aperture therethrough;
   a deformable, silicon-based membrane disposed at the support ring and having a front surface and a back surface coated with a conductive layer, the conductive layer of the front surface having a reflective coating, the conductive layer of the front surface and the reflective coating extending across the inner surface of the support ring;
   a plurality of electrostatic actuators positioned in close proximity to the back surface of the membrane, to define a first gap between the plurality of electrostatic actuators and the back surface of the membrane;
   a transparent conductor assembly positioned in close proximity to the front surface and having a first optical flat covering the aperture and a second optical flat, the first optical flat having an anti-reflective coating applied to at least one surface of the optical flat, the second optical flat being an inset piece positioned immediately adjacent the first optical flat and disposed in the support ring, the inset piece being smaller in area than the aperture and extending into the aperture to define a second gap between the transparent conductor assembly and the front surface of the membrane;
   wherein deformation of the membrane is induced by a voltage differential, the voltage differential derived from a bias voltage applied to the transparent conductor and an actuator voltage applied to each of the plurality of electrostatic actuators.

2. The wavefront correction device of claim 1, further comprising:
   at least one metallic lead in electrical contact with each of the plurality of electrostatic actuators; and a direct drive backplane in electrical contact with the metallic lead and plurality of electrostatic actuators.

3. The wavefront correction device of claim 1, wherein the second gap is less than approximately 30 μm.

4. The wavefront correction device of claim 1, wherein the second gap is approximately 10 μm.

5. The wavefront correction device of claim 1, wherein a net tensile stress of the membrane is less than 50 MPa.

6. The wavefront correction device of claim 1, wherein a highest spatial frequency of the membrane is $f_s = (2*\text{actuator pitch})^{-1} > 0.5 \text{ mm}^{-1}$.

7. The wavefront correction device of claim 1, wherein a plurality of channels are etched into the transparent conductor assembly.

8. The wavefront correction device of claim 1, wherein a plurality of channels are etched into the support ring.

9. A wavefront correction device for an adaptive optic, comprising: a support ring having an inner surface defining an aperture therethrough; a deformable polyimide membrane disposed at the support ring and having a front surface and a back surface coated with a conductive layer, the conductive layer of the front surface having a reflective coating, the conductive layer of the front surface and the reflective coating fitting inside the aperture and contacting the inner surface of the support ring; a plurality of electrostatic actuators positioned in close proximity to the back surface of the membrane, to define a first gap between the plurality of electrostatic actuators and the back surface of the membrane; and a transparent conductor assembly positioned in close proximity to the front surface and having a first optical flat covering the aperture and a second optical flat, the first optical flat having an anti-reflective coating applied to at least one surface of the optical flat, the second optical flat being an inset piece positioned immediately adjacent the first optical flat and disposed in the support ring, the inset piece being smaller in area than the aperture and extending into the aperture to define a second gap between the transparent conductor assembly and the front surface of the membrane.

10. The wavefront correction device of claim 9, wherein a plurality of channels are etched into the transparent conductor assembly.

11. The wavefront correction device of claim 9, wherein a plurality of channels are etched into the support ring.

* * * * *